United States Patent

Kramer et al.

Patent Number: 5,819,189
Date of Patent: Oct. 6, 1998

[54] CONTROL SYSTEM FOR A MONORAIL VEHICLE

[75] Inventors: Michael J. Kramer, Burlington; Jerry A. List, Hebron; Weston R. Loomer, Walton; Thomas T. Von Handorf, Burlington, all of Ky.

[73] Assignee: HK Systems, Inc., New Berlin, Wis.

[21] Appl. No.: 631,366

[22] Filed: Apr. 12, 1996

[51] Int. Cl.[6] .............................. G01R 33/07; G05B 19/31
[52] U.S. Cl. ........................ 701/22; 318/602; 324/207.24; 324/207.2; 364/468.2; 364/478.17; 701/124
[58] Field of Search ..................... 364/424.024, 424.026, 364/424.083, 426.05, 447, 468.19, 468.2, 478.16, 478.05, 478.17; 104/53, 118, 168, 120; 318/254, 9, 568.16, 587, 602, 603, 135; 701/1, 2, 19, 20, 22–24, 54, 116, 117, 124, 99; 324/207.11, 207.13, 207.15, 207.2, 207.23–207.26; 73/514.31, 514.39; 395/80, 82, 93

[56] References Cited

U.S. PATENT DOCUMENTS

| | | | |
|---|---|---|---|
| 3,584,583 | 6/1971 | Cartwright | 105/4 |
| 3,638,093 | 1/1972 | Ross | 318/687 |
| 3,677,188 | 7/1972 | Bordes | 104/120 |
| 4,031,662 | 6/1977 | Beshany | 46/257 |
| 4,375,193 | 3/1983 | Sullivan | 104/118 |
| 4,447,771 | 5/1984 | Whited | 18/661 |
| 4,671,186 | 6/1987 | Kunczynski | 104/168 |
| 4,680,515 | 7/1987 | Crook | 318/318 |
| 4,692,674 | 9/1987 | Packard et al. | 318/254 |
| 4,698,562 | 10/1987 | Gale et al. | 318/254 |
| 4,748,387 | 5/1988 | Tanuma et al. | 318/254 |
| 4,815,582 | 3/1989 | Canziani | 198/370.07 |
| 4,938,355 | 7/1990 | Canziani | 206/372 |
| 5,027,712 | 7/1991 | Wallick | 104/94 |
| 5,065,963 | 11/1991 | Usui et al. | 256/187 B |
| 5,068,582 | 11/1991 | Scott | 318/254 |
| 5,089,733 | 2/1992 | Fukuoka | 310/67 R |
| 5,367,466 | 11/1994 | Canziani | 364/478.11 |
| 5,408,153 | 4/1995 | Imai et al. | 310/68 B |
| 5,595,121 | 1/1997 | Elliott | 104/53 |

*Primary Examiner*—William A. Cuchlinski, Jr.
*Assistant Examiner*—Edward J. Pipala
*Attorney, Agent, or Firm*—Nilles & Nilles, S.C.

[57] ABSTRACT

A monorail vehicle used for material handling purposes comprises a number of cars which run on a track. The cars are linked together in one or more trains and each train has a master car and several slave cars. An embedded computer in the master car keeps track of the location on the train on the track by means of pulses from a Hall effect sensor in a brushless DC motor which powers the train. A central computer in an off board work station issues commands to the train and by monitoring its position on the track loop, the embedded computer in the master car of the train determines when to execute the command. A special jumper is used to connect the cars of the train together which distributes control signals to the various cars in the train without regard to the position of the cars in the train.

12 Claims, 5 Drawing Sheets

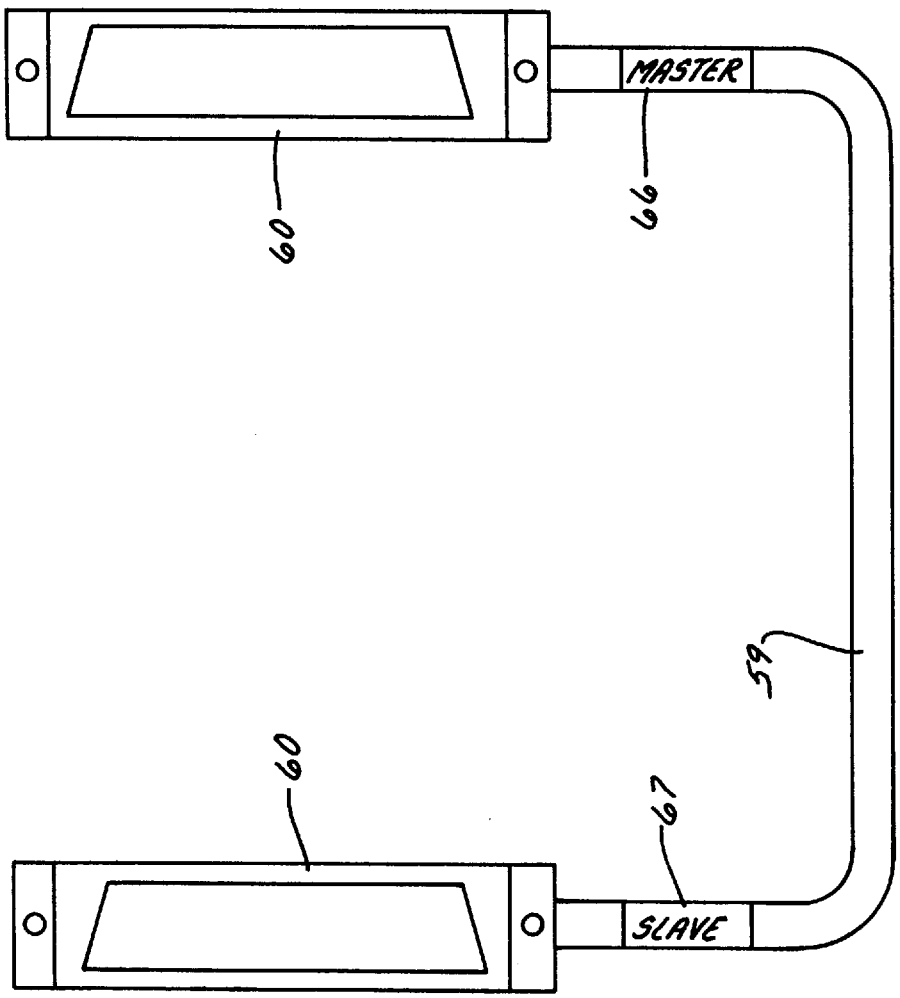

CONTROL SYSTEM FOR A MONORAIL VEHICLE

FIELD OF THE INVENTION

The invention relates to an electrical control system for a monorail train in which an encoding device provides position feedback to an embedded computer on the train enabling the train to execute a desired task at a particular location on the track by computing the location of the train on the track.

CONTROL SYSTEM FOR A MONORAIL VEHICLE

Monorail vehicles used for article sortation and other material handling purposes are well known in the art. Such vehicles run individually or in a train on a track and are usually electrically powered. Means must be provided for delivering power to the vehicle and for conducting signals to the vehicle telling it to stop or go or carry out some desired task. Such signals usually emanate from a central computer in a work station and are coupled to the vehicles by bus bars. The bus bars for prior art systems comprise two conductors for power transmission and several additional conductors for signals which are divided into a number of electrically discreet zones. In order for a certain task to be carried out at a particular zone, means must be provided to determine when a particular car is in the desired zone and to send a signal to that zone so that the task can be executed. If for example the track loop is divided into 150 zones, 150 separate hard wire connections have to be made between the central computer and the discreet zones. Such an arrangement is very expensive to install and maintain.

SUMMARY AND OBJECTS OF THE INVENTION

Accordingly to the invention, a material handling system includes a train of one or more cars which run on a track loop. One car of the train includes an embedded microprocessor for determining the location of the train and for controlling the operation of the cars of the train as the train travels around the track loop. A three-conductor bus bar is used to conduct power and signals from an off-board computer to the train and means on the train determine the location of the train as it travels around the loop so that an assigned task can be executed at a desired location. If a train consists of more than one car, the train comprises a master car and one or more slave cars. The cars of each train are hard wired together by jumpers which are configured so that each jumper is the same although the number of active wires in each jumper decreases as the distance from the master car increases.

It is accordingly an object of the invention to provide a train of cars for material handling purposes in which means on the train keep track of the location of the train as it travels along the track.

It is another object of the invention to provide an electrically powered train of cars for material handling purposes in which power and signals for operating the train are conveyed to the train by a three wire bus bar.

It is another object of the invention to provide a train of cars for material handling purposes in which one of the cars is the master and the other cars are slaves and identical jumpers are used to hard wire the cars together without regard to the position of the car in the train.

These and other objects of the invention will be apparent from the following detailed description in which reference numerals used throughout the description correspond to reference numerals used on the drawing figures.

BRIEF DESCRIPTION OF THE DRAWINGS

FIG. 5 shows a jumper cable used in the interconnections of FIG. 4.

DESCRIPTION OF THE PREFERRED EMBODIMENT

Figure 1:
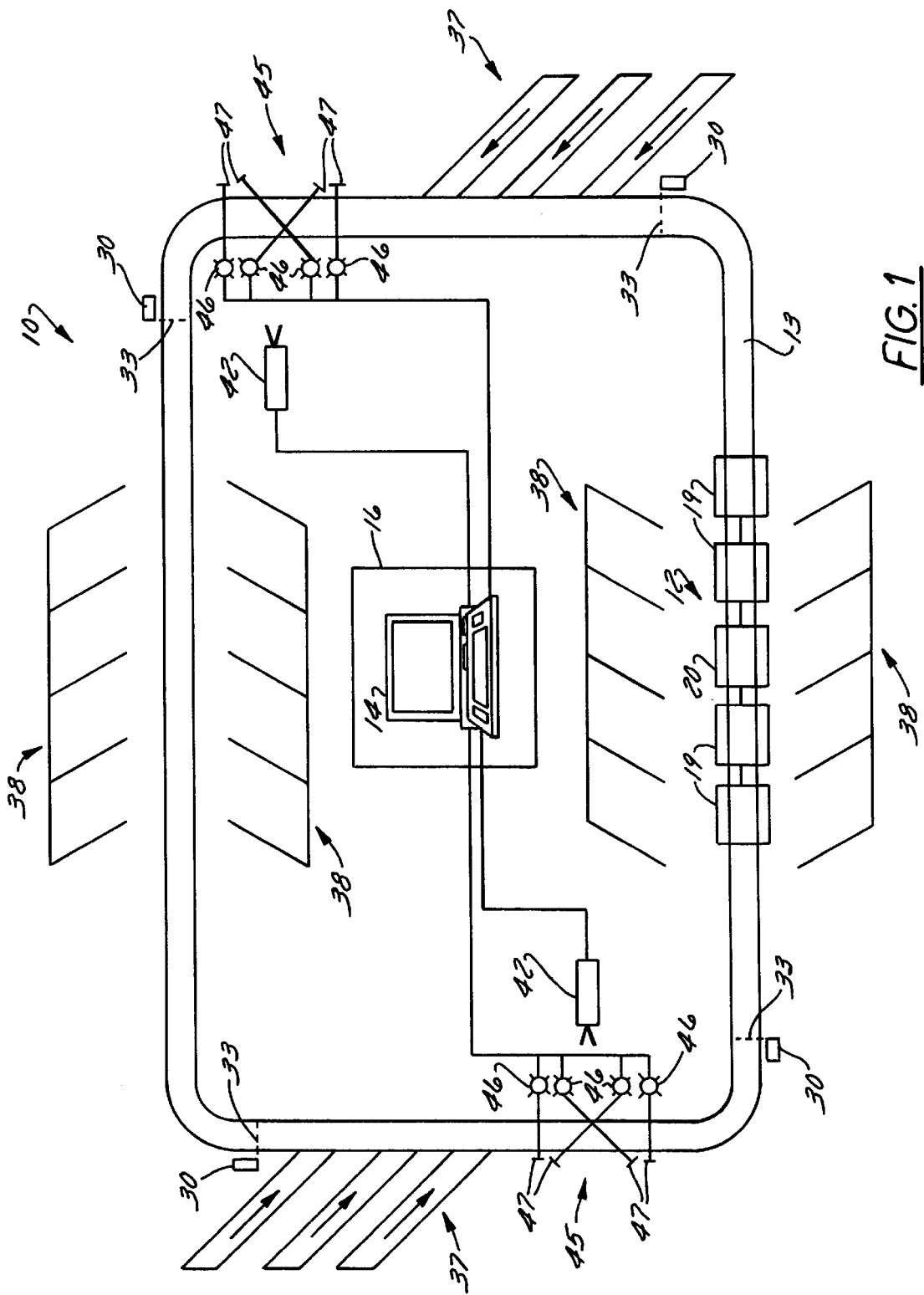
FIG. 1 shows a typical material handling installation according to the invention.
Figure 2:
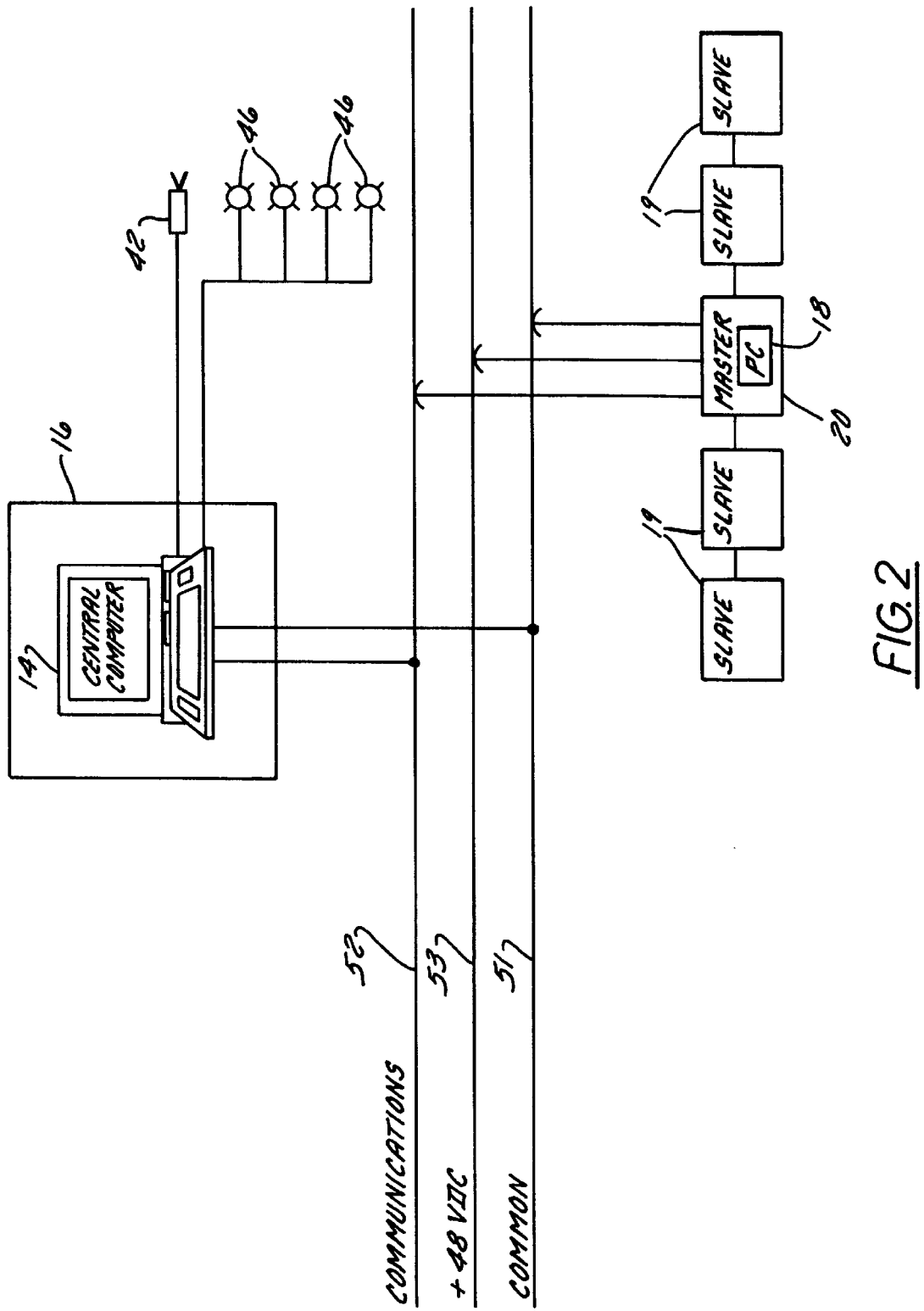
FIG. 2 shows the bus bar arrangement which is used with the invention.
Figure 3:
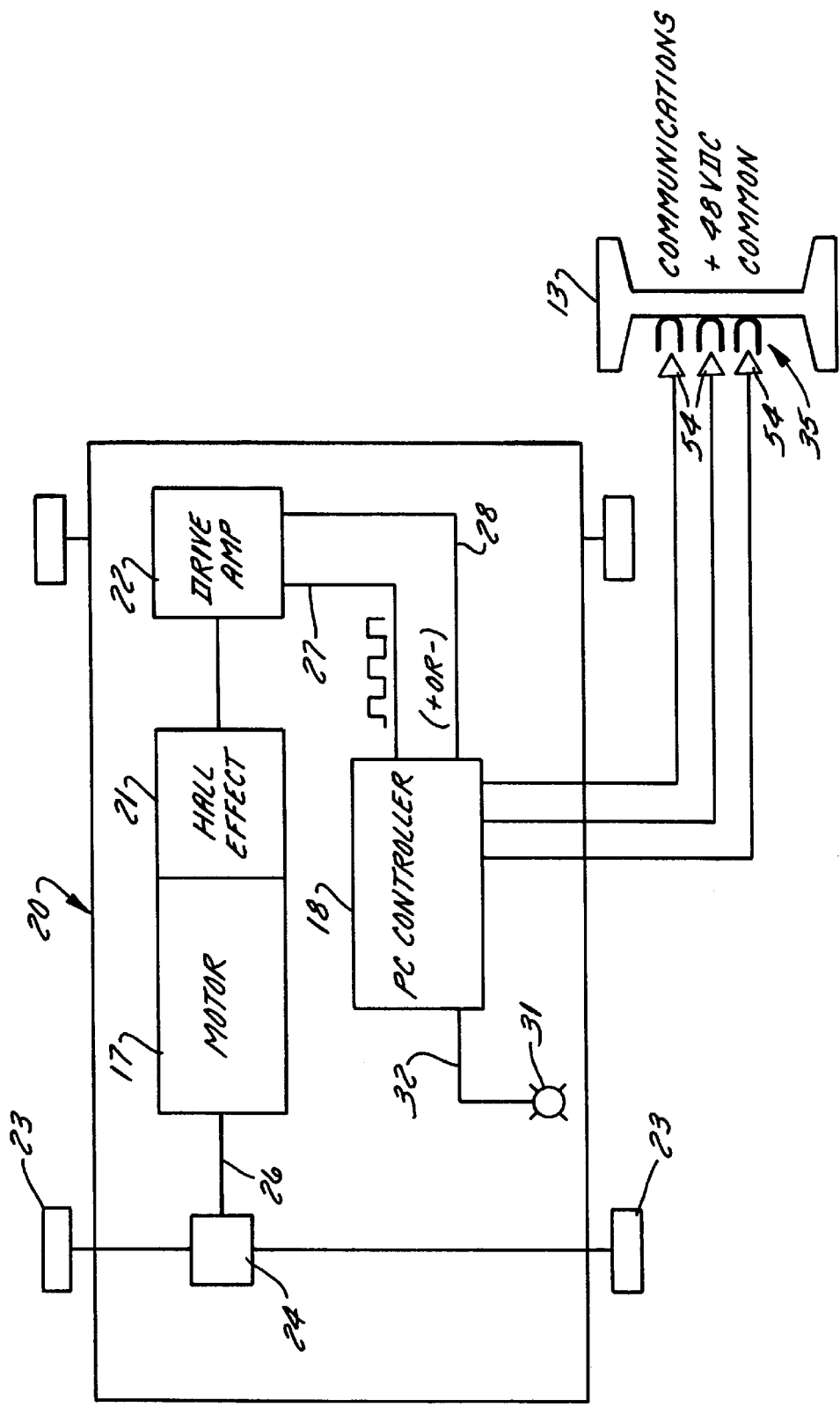
FIG. 3 shows the elements on a master car.

Referring now to the drawing figures, FIG. 1 shows a monorail system used for material handling purposes generally designated by the reference numeral 10. The monorail system comprises a series of cars 12 which are linked together in a train and travel around a track 13 under the control of a central computer 14 in an off-board work station 16. The number of cars in a typical train is five to six and one of cars in the train is a master car 20 and the other cars are slave cars 19. Turning to FIG. 3, the master car 20 is equipped with an electric motor 17 to propel the train along the track and an embedded PC controller 18 is used to regulate the speed of the train and to communicate with the central computer. The PC controller also controls the other cars of the train. The PC controller 18 is based on PC 104 architecture because of its ruggedized construction, miniaturized design and commercial availablility.

The motor 17 in the master car is a brushless DC motor which is electrically commutated by a Hall effect sensor 21 in a manner which is well known in the art. The signals pulses from the Hall effect sensor may also be used to determine the position of the train on the track by coupling the pulses to a drive amplifier 22 which produces a serial pulse train on output 27 indicative of the number of revolutions of the motor and a positive or negative polarity signal on output 28 indicative of the direction of rotation of the motor. These pulses may be counted up or down in the controller 18 to determine the number of revolutions of the motor and the resulting number of revolutions of the drive wheels 23 of the master car after taking into account any gear reducer 24 which may be interposed between the output drive shaft 26 of the motor and the drive wheels 23. The polarity signal on line 28 is used by the controller 18 to compute whether the train is going forward or backward on the track. Thus, the number of revolutions of the drive wheels plus the polarity signal on line 28 may be used by the PC controller 18 to determine the position of the train on the track.

Referring back to FIG. 1, a reflector 30 is used at various locations along the track loop to provide synchronizing pulses to the master car. When the master car passes one of the reflectors 30, a reflective mode photocell 31 on the master car produces a pulse on line 32 which tells the PC controller on board the car that the car is at the zero position 33 in a particular zone on the track. The embedded PC controller then updates the location of the train as it travels around the track by counting pulses from the Hall effect sensor 21 and using that information to determine the distance that the train travels from the zero position on the track in a manner which is well known in the art.

Each train has a unique address to distinguish it from other trains on the track and signals which are sent on the bus bars 35 from the central computer are addressed to a particular train. The embedded controller 18 in the master car in each train will only listen to signals which are addressed to it and will receive all the signals which are intended for any of the cars in that particular train.

In the event the train is to be used as a sortation system, one or more induction stations 37 and a plurality of sortation locations 38 will be positioned along the track loop. When an article is loaded onto a car at an induction station, either automatically or by hand, the identification of the article and its destination or sort location is input into the central computer 14, usually by bar code scanning. A bar code scanner 42 will read the bar code on an article carried by a car as the car passes through the scanner. This information is sent by the bar code scanner to the central computer 14 which can determine which train and car is carrying the article from the reported position of the train sent by the PC controller in the train. Once induction has occurred, the car passes through a load sensing station 45 comprising an array of photocells 46 and detectors 47 which are mounted on opposite sides of the track. As a car with a load passes through the photocell beams, the leading and trailing edge of the load is detected and this information together with information concerning the distance of the car from the zero position 33 on the track as determined by counting pulses from the Hall effect sensor is used to determine which car is carrying the load. One of the photocells 46 and the detectors 47 is arranged to detect the leading edge of a car and this information together with the information concerning the leading and trailing edge of the load is used to determine the relative position of the load on the car.

The embedded controller 18 in the train will keep track of the location of the car by means of pulses from the Hall effect sensor and when a car is in position to discharge the article into the proper sort location 38 the discharge mechanism on the car will be activated by the embedded controller. In the event that the load is not centered front-to-rear on the car as determined by the signals from the load sensing station 45, the timing of article discharge can be advanced or retarded as necessary by the controller 18 so that the article is discharged perfectly into the center of the sortation station. The timing of article discharge can also be adjusted to compensate for the speed of the car as it approaches the sortation station since the speed can be calculated by the controller from the rate at which pulses are received on line 27 from the drive amplifier 22. The speed of the car will affect the trajectory of an article which is discharged into a chute 38 and accordingly, the higher the speed of the car the more advanced the discharge has to be in order to project an article into the chute.

Figure 4:
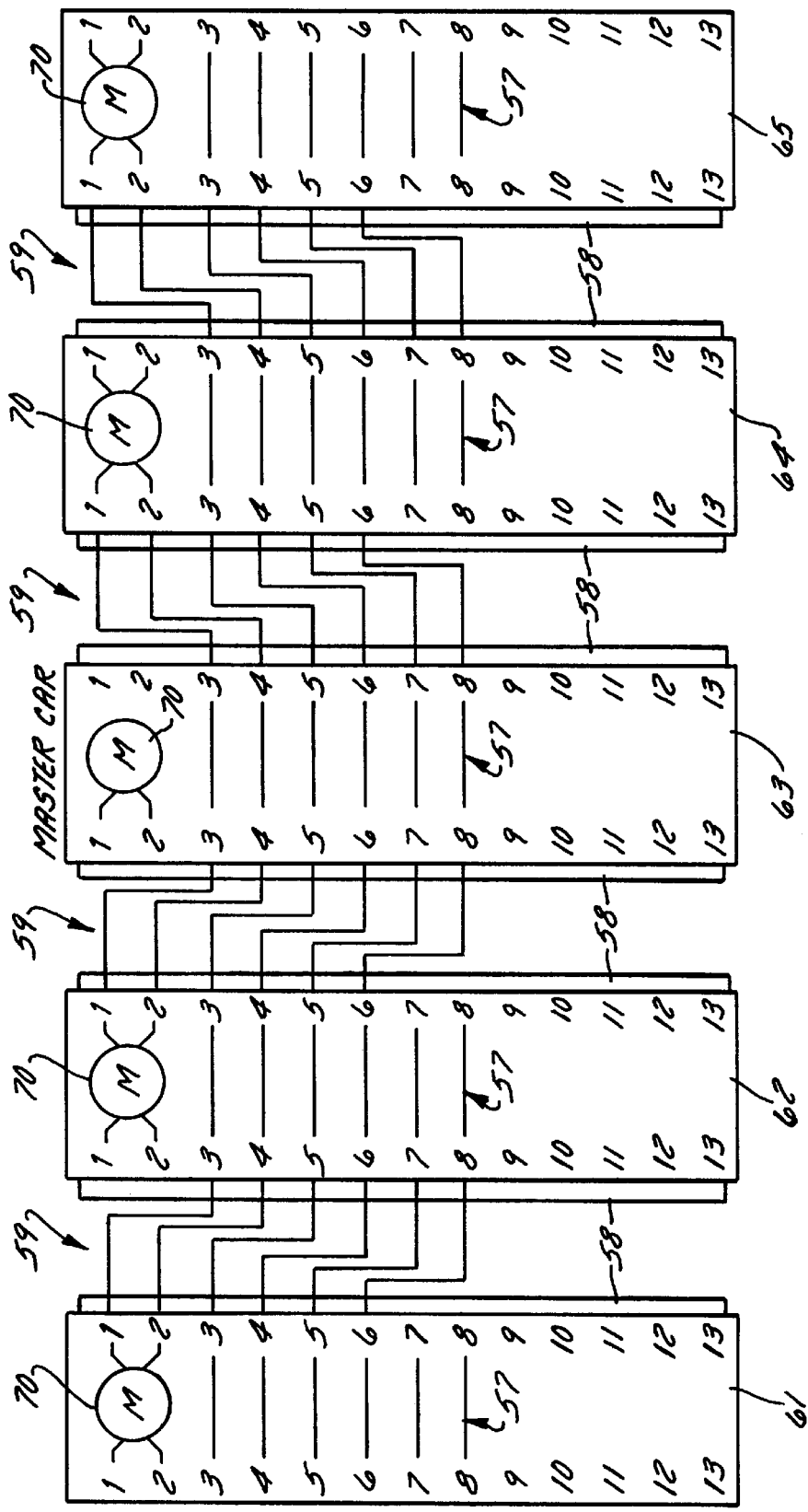
FIG. 4 shows the interconnections between the cars of the material handling train.

The central computer 14 communicates with the master car in each train by sending signals on the bus bars 35 and the master car communicates with the slave cars through the interconnect scheme best seen in FIG. 4.

A three wire continuous bus bar of the type which is commercially available is used. Conductor 51 acts as a common ground for power and communication signals. Communication signals are carried by conductors 52 and 51 of the bus bar and power is carried by conductors 53 and 51. The power and communication signals on the bus bars are coupled to the master car in the train by collector brushes 54 mounted on the master car which contact the bus bars in a manner which is well known in the art. The power on the bus bars 53 and 51 is less than 50 volts DC for safety reasons and the communication signals on the bus bars 52 and 51 are approximately 15 volts peak-to-peak.

The hard wire harness comprises wires 57 which are permanently affixed to each car and terminate in connectors 58 and jumpers 59 which connect the cars to one another. In the event that the train comprises five cars, the master car 63 is positioned in the center of the train with two slave cars 61 and 62 in front of it and two slave cars 64 and 65 behind. Signals which are sent to the master car 63 include instructions for all of the cars in the train by car position, i.e., slave 61, slave 62, master 63, slave 64, and slave 65. In actual use, the cars in one train may change relative positions in the train by being removed from the train and replaced in another position or may be removed completely from the train and replaced with a car from another train. The wiring scheme and harness according to the instant invention allows the cars to be interconnected without keeping track of the relative position of the cars in the train. As shown and described below, the wires 57 which are permanently fixed to each car are the same for all of the cars and the jumpers 59 which are used between the cars are all the same.

Each end of each car has a thirteen (13) pin connector 58 mounted on it which is designed to mate with a thirteen (13) pin connector 60, best seen in FIG. 5, on the end of the jumper cables 59. D-subminiature connectors may be used on the ends of the jumper cables and on the ends of the wires which are permanently attached to the cars to ensure proper polarity connections. All of the connectors 58 which are mounted on the cars are male and all of the mating connectors 60 which are mounted on the ends of the jumpers are female. Each jumper cable has a master end 66 and a slave end 67. The master end 66 of the cable is always coupled to the master car if the jumper is being used between a master car and a slave car. If the jumper is being used between two slave cars, the master end 66 of the jumper is coupled to the car which is closest to the master car. There is a shift of two pin positions in each of the jumpers between the master end 66 and the slave end 67. As shown, pins 3 and 4 on the master end of each jumper are coupled to pins 1 and 2 on the slave end, pins 5 and 6 on the master end 66 are coupled to pins 3 and 4 on the slave end 67, and pins 7 and 8 on the master end 66 are coupled to pins 5 and 6 on the slave end 67.

Each of the cars has a motor 70 to activate the discharge mechanism on the car and pins 1 and 2 on all of the car mounted connectors 58 are used to couple control signals received by the master car from the central computer to the motor. The master car 63 sends control signals to car 62 on pins 3 and 4 and to car 61 on pins 5 and 6. The jumper between master car 63 and slave car 62 couples pins 3 and 4 on the master car to pins 1 and 2 on the slave car 62 and at the same time couples pins 5 and 6 on the master car 63 to pins 3 and 4 on slave car 62. Pins 1 and 2 of car 62 couple the signal from the master car 63 to the sort motor 70 on car 62 and pass the signals on pins 3 and 4 to pins 3 and 4 on the other end of the car. Pins 3 and 4 on the other end of the car 62 are coupled by the jumper to pins 1 and 2 of car 61. Pins 1 and 2 of car 61 couple the signal received to the motor 70 on car 61. The jumpers which are used between cars 63 and 64 and between cars 64 and 65 are used to couple the signals from the master car 63 in a similar way.

In the event car 62 becomes disabled and has to be removed from the train, car 61 can be coupled to master car 63 by using the same jumper 59. The control signals for car 61 in the new position next to car 63 will be sent from pins 3 and 4 on car 63 to pins 1 and 2 of car 61. It will be appreciated by those skilled in the art that any jumper may be used between any car in the train and any slave car may be used in any position on the train and as long as the master end 66 of the jumper is coupled to the master car or to the car in the train which is closest to the master car. The design of the jumper 59 ensures that signals from the master car will always be coupled to the correct pins on the slave cars so that the slave cars will receive the proper operating signals.

Having thus described the invention, various modifications and alterations will occur to those skilled in the art, which modifications and alterations will be within the scope of the invention as defined by the appended claims.

What is claimed:

1. A control system for a monorail train which runs on a track, the control system comprising:

a DC brushless motor which produces motive power for the train;

at least one Hall effect device which both (a) commutates the motor and (b) permits a determination of the number of revolutions of the motor;

a PC controller on the train;

and means for coupling signals from the Hall effect device to the PC controller so as to permit the PC controller to update the position of the train on the track.

2. The control system of claim 1 wherein one or more positions on the track is designated zero positions and means are provided at the zero positions on the track for producing a signal which is used by the PC controller to determine the position of the train on the track.

3. The control system of claim 1 wherein signals from the Hall effect sensor are coupled to a drive amplifier and the drive amplifier provides a series of pulses indicating motor revolutions to the PC controller and a positive or negative signal to the PC controller indicating direction of motor rotation.

4. The control system of claim 1, further comprising:

means for calculating the speed of the train on the track based on the rate at which pulses are received from the Hall effect device, and means for timing the discharge of a load on a car to compensate for the speed of the car.

5. The control system of claim 4, further comprising:

means for timing the discharge of the load to compensate for the acceleration of the car.

6. A control system for a monorail train which runs on a track, the control system comprising:

a DC brushless motor which produces motive power for the train:

at least one Hall effect device for commutating the motor, a PC controller on the train, means for coupling signals from the Hall effect device to the PC controller, whereby the PC controller can update the position of the train on the track, and sensors positioned along the track for detecting the presence of a load on a car of the train, and for detecting whether the load is centered on the car, or is located to the front or rear of the car, whereby the PC controller can advance or retard discharge of a load from the car depending on the location of the load on the car.

7. A method for controlling a monorail train which runs on a track in which a DC brushless motor on the train produces motive power for the train and is commutated by a Hall effect device, comprising the steps of:

commutating the motor by the Hall effect device, obtaining a first signal from the Hall effect device, transmitting the first signal to a PC controller on the train, obtaining a second signal from the Hall effect device indicating a direction of rotation of the motor, transmitting the second signal to the PC controller, updating the position of the train on the track based on the first and second signals.

8. The method of claim 7, further comprising the steps of:

designating one or more zero positions on the track, providing a signal at the zero positions for use by the PC controller to determine the position of the train on the track.

9. The method of claim 7, wherein the second signal is derived from the first signal.

10. The method of claim 7, further comprising the step of:

advancing or retarding discharge of a load from a car of the train based on the speed of the car.

11. The method of claim 7, further comprising the step of:

advancing or retarding discharge of a load from a car of the train based on the acceleration of the car.

12. A method of timing the discharge of a load on a material handling train on at least one track, the method comprising the steps of:

positioning at least one sensor along the track for detecting the presence of a load on a car on the train, detecting whether the load is longitudinally centered on the car, or is located to the front or rear of the car based on signals from the sensor, and advancing or retarding discharge of a load on a car depending on the location of the load on the car.

* * * * *